E. V. JONES.
APPARATUS FOR INJECTING FLUIDS AND SEMISOLIDS.
APPLICATION FILED JULY 23, 1919.
1,328,567.
Patented Jan. 20, 1920.
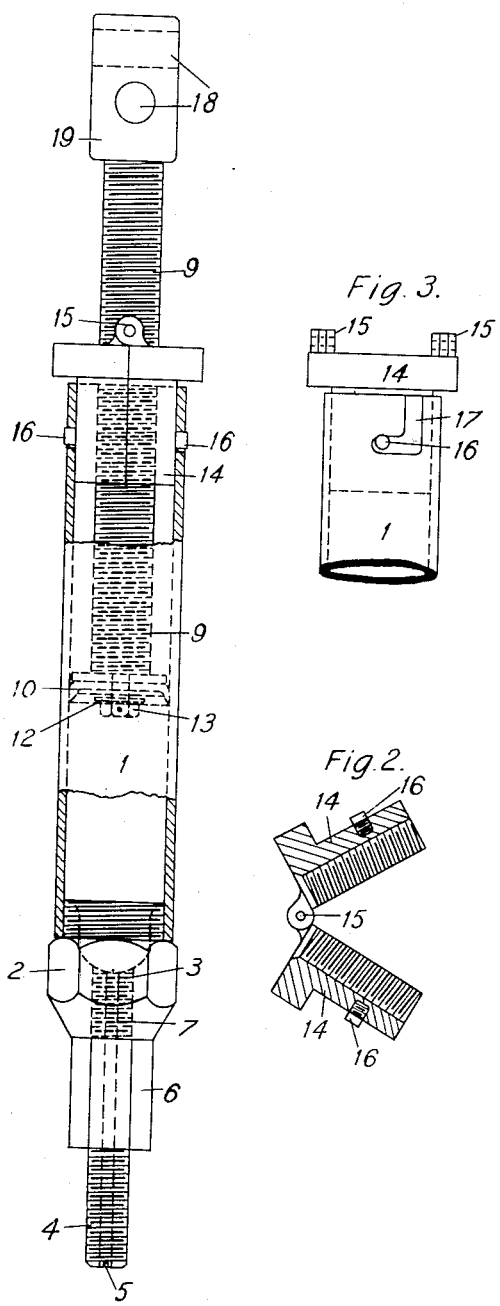
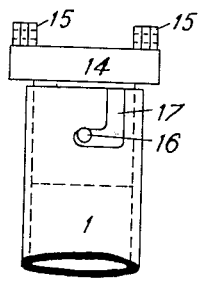
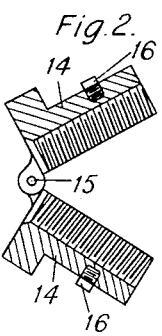
Inventor
Edmund Vaughan Jones
By Spear, Middleton, Donaldson & Hall
Attys.

UNITED STATES PATENT OFFICE.

EDMUND VAUGHAN JONES, OF ROCK FERRY, ENGLAND.

APPARATUS FOR INJECTING FLUIDS AND SEMISOLIDS.

1,328,567.  Specification of Letters Patent.  Patented Jan. 20, 1920.

Application filed July 23, 1919. Serial No. 312,868.

*To all whom it may concern:*

Be it known that I, EDMUND VAUGHAN JONES, a subject of the King of Great Britain, and residing in Rock Ferry, in the county of Chester, England, have invented certain new and useful Improvements in Apparatus for Injecting Fluids and Semisolids, of which the following is a specification.

This invention relates to apparatus for injecting fluids and semi-solids, and has reference more particularly to a portable injector comprising a cylinder fitted with a displacing piston or plunger, which is used for injecting through holes subsequently plugged, red lead and the like into the spaces which are unavoidably formed in riveted and the like structures where several plates meet, as, for example, at the junction of a longitudinal and transverse joint.

In known constructions of such injectors, the cylinder is fitted with a displacing ram the shank of which is screwed throughout its length and passes out through a nut fixed in the head of the cylinder, the opposite end of the cylinder having a suitable outlet through which the red lead is injected into the cavity which it is desired to fill; when the outlet is connected with the cavity, the ram, by rotation of the screwed shank in the fixed nut, is forced inwardly and displaces the red lead, expelling it through the said outlet into the space to be filled; when the contents of the cylinder have been expelled, it is necessary, in existing constructions, to rotate the ram in the reverse direction so as to withdraw the shank completely, and with it the ram, in order that the cylinder may be re-charged and the operation repeated; considerable waste of time results from this process, and the object of the present invention is to obviate this, and generally to improve the construction of such apparatus.

According to the present invention, the nut in the head of the cylinder, in which the screwed shank of the ram fits, is split and detachably secured in the cylinder head, the arrangement being such that when the nut is withdrawn it is adapted to be opened and slid from one end of the shank to the other.

In the preferred arrangement, the nut is made in flanged halves, which halves are pivoted together beyond the flanges so that when they are opened the screwed shank is clear of the screw thread of the nut; the latter can therefore, without relative rotation between the two parts, be slid rapidly from end to end without rotation, and be re-inserted in the cylinder.

When the two halves are closed together, the internally screwed portion fits the screwed shank and the external cylindrical portion is a close fit in a socket provided in the head of the cylinder, said external portion being provided with two pins which slide into L-shaped recesses formed in the wall of the cylinder, the transverse portions of said recesses being obliquely arranged so that axial pressure on the nut tends to maintain the latter in position in the slot, as in a bayonet joint.

The end of the ram has a piston head which fits the interior of the cylinder, said piston head being adapted to carry a leather washer held in place by a screw and a metal washer.

The outlet at the end of the cylinder is tapped and takes a screwed and renewable nozzle or nipple, which nipple fits directly into the tapped hole leading to the cavity to be filled; the nipple may be long enough to permit the extreme end to be sawed off from time to time as the threads at the end become damaged by the frequent screwing into the tapped holes, or by the comparatively rough usage the appliance is subjected to.

I have illustrated my invention, as applied to a pump for injecting red lead into the cavities in riveted joints, in the accompanying drawings, in which:—

Figure 1 is an elevation, partly in section, of the pump, and Figs. 2 and 3 detail views of the hinged nut.

The pump comprises a barrel 1 screwed interiorly at one end to take the screwed end-piece 2, between which and the barrel a fluid-tight joint is made. The end-piece 2 has a through-bore 3 which is interiorly screwed to take a renewable nipple 4 having a through-bore 5; the nipple has a head 6 by which the screwed shank 7 is screwed into position in the bore of the end-piece so as to make a fluid-tight joint therewith; the screwed part 4 of the nipple is adapted to fit the tapped hole into which the red lead or the like has to be injected, and it is made long enough to permit the end being sawed off when the end of the screw thread becomes damaged.

The red lead is forced out through the bore 5 by means of a screwed ram 9 to the end of which a cup leather 10 is secured by means of the metal washer 12 and screw 13.

The ram is propelled axially along the barrel by rotating the screwed part 9 in a nut 14 which is held fixed in the head of the barrel.

The nut 14 is made in halves preferably hinged together by pivotal joints between the lugs 15, the hinge center line being so arranged that the halves when opened out (as shown in Fig. 2) are clear of the screw which the nut fits when closed.

The exterior of the nut, when closed, is cylindrical and fits the bore of the head of the barrel, and in the arrangement illustrated, it is held in position by means of a bayonet-joint formed by pins 16 which fit in L shaped slots 17 in the barrel head.

In using the appliance the barrel is charged with the red lead mixture, the nut is clasped on the piston end of the screwed shank, and the piston and nut are inserted in the barrel head, the latter being fixed by the bayonet-joint.

The nipple 4 is then screwed into the tapped hole leading to the cavity in the riveted joint, and the ram is fed forward by means of a podger or pin inserted in the holes 18 in the ram head 19.

When the contents of the barrel have been expelled, the ram and nut are withdrawn and the barrel is re-charged; the nut is opened and slid back to the piston end of the screwed ram and is there clasped on the ram and the latter, and the nut re-inserted in the barrel head.

By the use of an appliance constructed as described, the time occupied in withdrawing and replacing the ram and re-charging the cylinder is very considerably reduced.

Instead of dividing the nut into two parts it may be divided into three segments pivoted together so as to open clear of the screw.

Having now fully described my invention, I declare that what I claim, and desire to secure by Letters Patent is:—

1. In apparatus for injecting fluids and semi-solids, the combination of a tubular casing having an outlet at one end and being open at the other, a ram provided with a piston head fitting the casing and a screw-threaded shank, a two part nut the parts of which are hinged together and the bore of which when closed fits the said shank and the body of which when closed fits into the open end of the casing, and attachment means formed on the two part nut and on the casing for retaining the nut in position in the casing; substantially as described.

2. In apparatus for injecting fluids and semi-solids, the combination of a tubular casing having an outlet at one end and being open at the other, a ram provided with a piston head fitting the casing and a screw threaded shank, a two part flanged nut the body of which fits the casing and the bore of which fits the shank, the said two portions being hinged together about a diametral axis located beyond the screwed portion of the said bore, and means formed on the body of the two part nut and on the casing to retain the nut in position in the casing: substantially as described.

3. In apparatus for injecting fluids and semi-solids, the combination of a tubular casing having an outlet at one end and being open at the other, a ram provided with a piston head fitting the casing and a screw threaded shank, a two part flanged nut the body of which fits the casing and the bore of which fits the shank, said flange being of larger diameter than the casing, lugs formed on the two portions of the flange at opposite ends of a diameter and forming a double pin hinged joint the axis of which is beyond the screwed portion of said bore, and bayonet joint attachment means consisting of pins on the body of the two part nut and L-shaped slots in the casing: substantially as described.

4. In apparatus for injecting fluids or semi-solids, the combination of a tubular casing having a detachable screwed spigot secured to the one end of the casing and the bore of which forms an outlet from the casing, said casing being open at the other end, a ram provided with a piston head fitting the casing and having a screw-threaded shank, a two part nut the parts of which are hinged together and the bore of which when closed fits the said shank and the body of which when closed fits into the open end of the casing, and attachment means formed on the two part nut and on the casing for retaining the nut in position in the casing: substantially as described.

5. In apparatus for injecting fluids and semi-solids, the combination of a tubular casing having a detachable screwed spigot secured to the one end of the casing and the bore of which forms an outlet from the casing, said casing being open at the other end, a ram provided with a piston head fitting the casing and a screw-threaded shank, a two-part flanged nut the body of which fits the casing and the bore of which fits the shank, said flange being of larger diameter than the casing, lugs formed on the two portions of the flange at opposite ends of a diameter and forming a double pin hinged joint the axis of which is beyond the screwed portion of said bore, and bayonet joint attachment means consisting of pins on the body of the two part nut and L shaped slots in the casing: substantially as described.

In witness whereof I have set my hand in presence of witnesses.

EDMUND VAUGHAN JONES.

Witnesses:
    J. E. LLOYD BARNES,
    JOSEPH E. HIRSH.